(No Model.) 2 Sheets—Sheet 1.

S. M. PARKER & C. E. SMOCK.
COW STABLE APPLIANCE.

No. 553,213. Patented Jan. 14, 1896.

Witnesses:
C. E. Van Doren,
Richard Paul.

Inventors:
Sewell M. Parker
Calvin E. Smock.
By Paul & Hawley
their Att'ys.

UNITED STATES PATENT OFFICE.

SEWELL M. PARKER AND CALVIN E. SMOCK, OF MINNEAPOLIS, MINNESOTA; SAID SMOCK ASSIGNOR TO SAID PARKER.

COW-STABLE APPLIANCE.

SPECIFICATION forming part of Letters Patent No. 553,213, dated January 14, 1896.

Application filed June 22, 1895. Serial No. 553,658. (No model.)

*To all whom it may concern:*

Be it known that we, SEWELL M. PARKER and CALVIN E. SMOCK, of Minneapolis, in the county of Hennepin and State of Minnesota, have invented certain new and useful Improvements in Cow-Stable Appliances, of which the following is a specification.

Our invention relates to devices for keeping the cows and the floor of the tie-up clean and dry; and the object of our invention is to provide a suitable suspended receptacle to receive the droppings, and to move freely with the animal while standing in the stall, and to remain in its normal suspended position when the animal lies down, whereby the cow is kept perfectly clean, and as all the droppings are caught by the receptacle the floor of the tie-up is entirely free from filth and the strong odor which usually pervades a cow tie-up.

Our invention consists generally in the constructions and combinations hereinafter described, and particularly pointed out in the claims.

Figure 1:
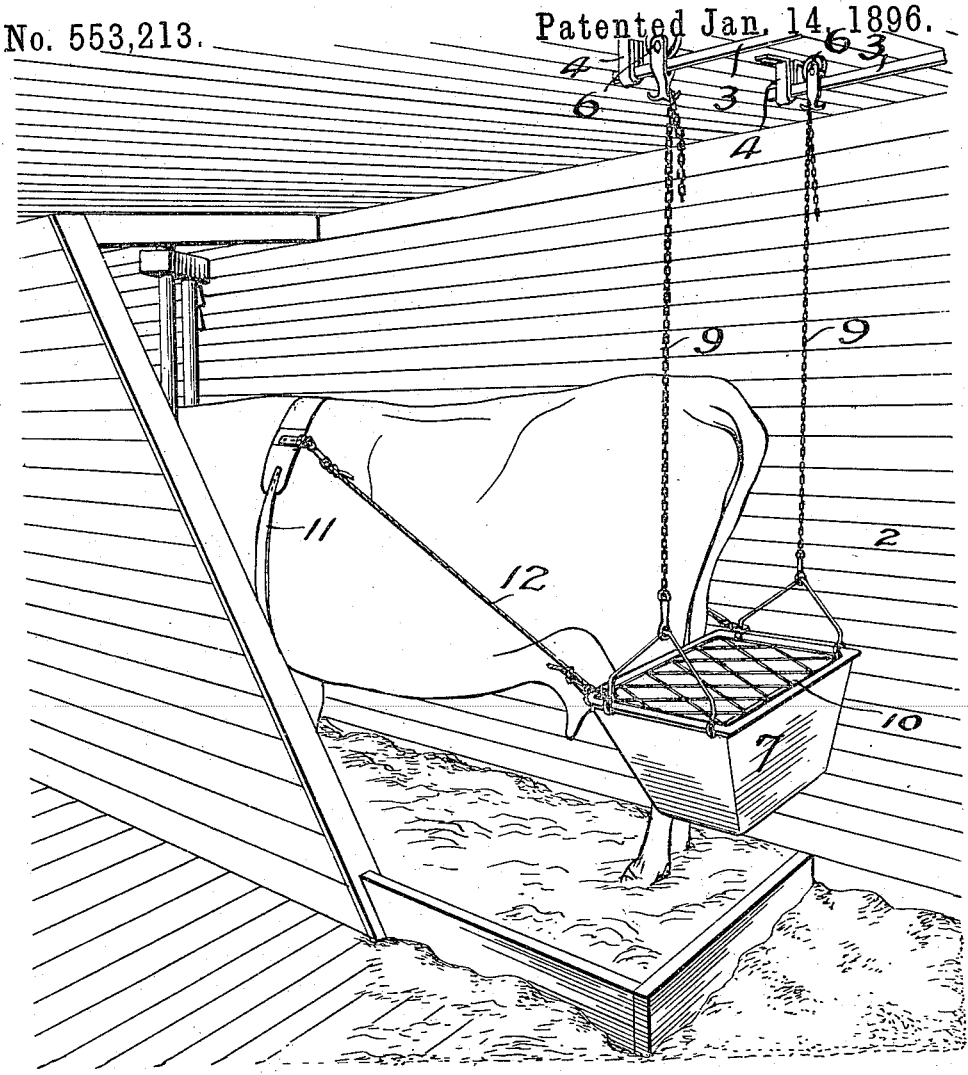
Figures 3, 4:
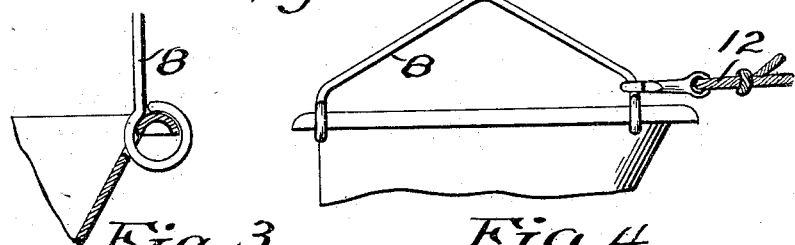
Figure 2:
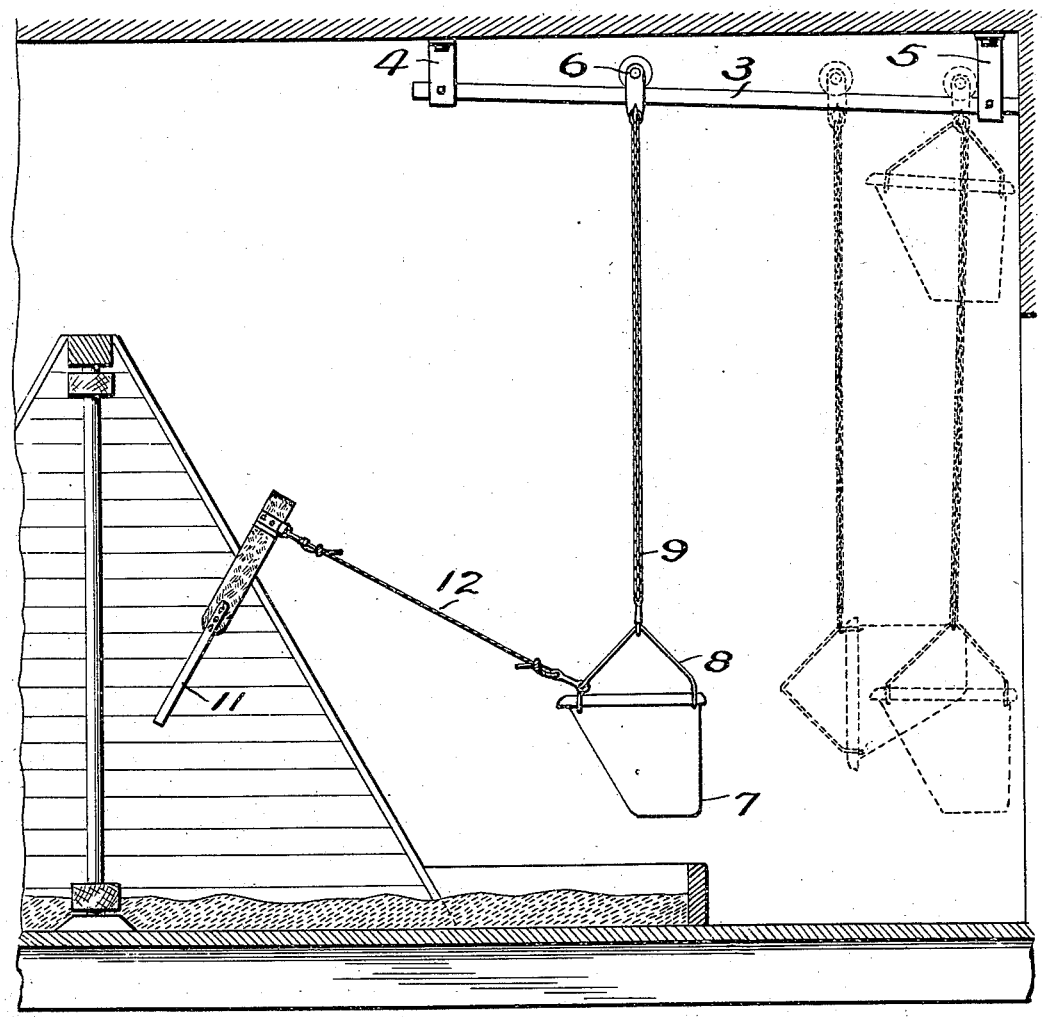

In the accompanying drawings, forming part of this specification, Figure 1 is a view of a cow-stall, showing the device in use. Fig. 2 is a vertical sectional view of the cow-stall, showing the receptacle and its supporting-track, the different positions of the receptacle when not in use being indicated by dotted lines. Fig. 3 is a view of a portion of the receptacle, showing the method of securing the bail to the same. Fig. 4 is a similar view showing the method of securing the harness to the receptacle.

In Fig. 1 of the drawings is shown a cow-stall of the ordinary size and construction, having preferably a level floor and provided with a box filled with sawdust or other suitable material, forming a place for the animal to stand during the day and a bed at night. Suspended behind the cow, preferably from the ceiling and running lengthwise of the stall, is a track comprising the rails 3, supported at each end by the hangers 4 and 5, and provided with the wheels or pulleys 6 adapted to roll upon the upper edge of the track, and provided upon the under side with hooks for the purpose hereinafter described. The hangers 5 are a little longer than those at the opposite end of the track, so that the rails have a slight backward incline, as shown in Fig. 2. For receiving the droppings we provide a pan or receptacle 7, made preferably of sheet metal, having flaring sides and outwardly-turned upper edges, as shown in Fig. 3. The pan may be made of any desired length, and is provided at each end with bails 8, having their ends passed through openings in the upper edge of the pan and looped around the outwardly-turned edges of the same, as shown in Fig. 3.

Chains or chords 9 are provided to connect the bails with the hooks provided upon the under side of the wheels or rollers 6, as shown in Fig. 1. These chains are adjustable, so that the pan may be supported at any desired height, and the top of the pan is covered with a screen or grating 10, which prevents the cow from getting her tail into the pan. A surcingle 11, is provided to pass about the body of the cow, and traces 12 connect the bails of the pan with the surcingle at a point over the back of the animal, as shown in Fig. 1.

When in use the pan is close to the legs of the cow, but the traces are sufficiently loose so that it does not in any way interfere with the movement of the animal while standing in the stall or while in the act of lying down.

When it is desired to empty the receptacle the traces are unhooked and the pulleys or wheels supporting the pan allowed to roll back along the track to the position indicated by dotted lines in Fig. 2. The pan may then be dumped and attached to the cow again, or hung up at a distance from the floor, as shown in the same figure.

The device can be used in any tie-up. It can be suspended from the side wall, if desired; the animal to which it is attached can move freely about the stall; the floor of the tie-up is always clean and dry, and the health of the cow and the quality of the milk greatly improved by its use.

Level rails could be used for supporting the pan, but we prefer the inclined or slanting rails, as shown, as the weight of the pan is sufficient to move the same down the track out of the way of the cow when the traces are loosened as the animal is in the act of lying down, and by connecting the traces to the harness at a point over the back of the cow, as shown, they will be sufficiently loose to allow the pan to move back so that it will not be struck by the rump of the animal when in the act of lying down.

Having thus described our invention, we claim as new and desire to secure by Letters Patent—

1. A cow stable appliance, comprising a pan or receptacle suspended independently, but freely movable with the animal while standing in the stall, a harness, suitable flexible connections between the pan and the harness, said connections being attached to the harness at a point over the back of the cow to permit the pan to swing back out of the reach of the animal while in the act of lying down, substantially as described.

2. The combination, with the cow stall, of the backwardly inclined tracks arranged on the ceiling back of the stall, pulleys to run thereon, a pan suspended from said pulleys and hence freely movable toward and from the rear end of the stall or standing place, traces connected to said pan, and being of a length to hold the same in position to receive the droppings while the cow is standing in the stall, and being connected to the harness at a point over the back of the animal to permit the pan to drop down the inclined track when the animal lies down, for the purpose set forth.

In testimony whereof we have hereunto set our hands this 6th day of June, A. D. 1895.

SEWELL M. PARKER.
CALVIN E. SMOCK.

In presence of—
C. G. HAWLEY,
RICHARD PAUL.